United States Patent

[11] 3,629,954

[72] Inventor James P. Lavalier
Mahtomedi, Minn.
[21] Appl. No. 762,750
[22] Filed Sept. 26, 1968
[45] Patented Dec. 28, 1971
[73] Assignee Hart-Carter Company
Chicago, Ill.

[54] GRAVITY FLOW GRAIN DRIES
6 Claims, 9 Drawing Figs.
[52] U.S. Cl. ............................................. 34/167,
34/174
[51] Int. Cl. ....................................... F26b 17/12
[50] Field of Search ........................... 34/64, 65,
167, 169, 174, 196, 219; 99/246

[56] References Cited
UNITED STATES PATENTS
| | | | |
|---|---|---|---|
| 1,418,010 | 5/1922 | Martoccio .................. | 34/196 X |
| 2,764,819 | 10/1956 | Hallman ..................... | 34/169 X |
| 3,325,912 | 6/1967 | Bojner ........................ | 34/169 |

FOREIGN PATENTS
| | | | |
|---|---|---|---|
| 579,114 | 7/1958 | Italy ............................ | 34/217 |
| 153,733 | 8/1904 | Germany .................... | 34/174 |

*Primary Examiner*—Frederick L. Matteson
*Assistant Examiner*—Harry B. Ramey
*Attorney*—Rummler & Snow ABSTRACT: The disclosure describes a dryer for granular material provided with first and second successive zones to treat the material with heated gas under dehydrating conditions and a third zone connected therewith wherein the material is treated with incoming cool gas, characterized by passageways to conduct the flow of gas in opposite directions transversely through the first and second zones and means to combine the effluent gases from the second and third drying zones and supply heat thereto to form the heated gases used in the first and second zones. In one embodiment the granular material is passed successively through the first, second and third treating zones, the supply of cool gas is conveyed into the third zone to cool the dehydrated material therein, the effluent gases from the cooling zone are passed to a heating zone to form a portion of the dehydrating gas passed to the first and second zones while the effluent from the second zone is being recycled to the heating zone to be mixed with the effluent from the cooling zone and the effluent from the first zone is being exhausted from the system. In another embodiment the granular material is passed downwardly by gravity through perforated columns arranged in a vertical substantially parallel relationship, and a baffle system surrounds the columns to provide a division of the heated treating gas, between the first and second zones, whereby a portion of the gas is directed outwardly from between the columns in the second zone and then recirculated while the remainder of the gas is directed inwardly through the perforated columns of the first zone from which it is discharged as the effluent from the system. Other embodiments are disclosed including means to control the volume of recycled effluent from the second treating zone, e.g., the proportion of moisture laden gas sent to the heating zone for recirculation.

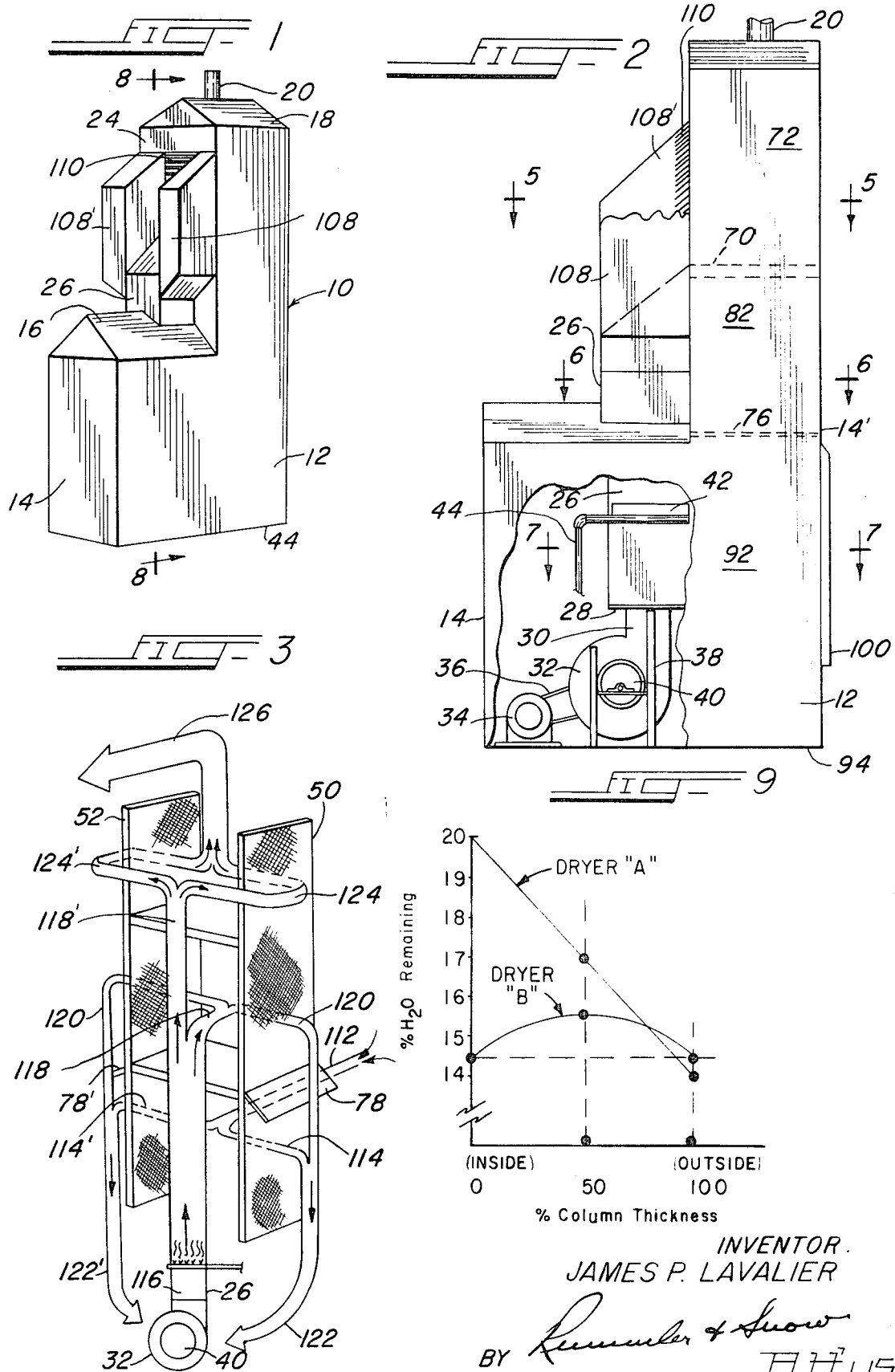

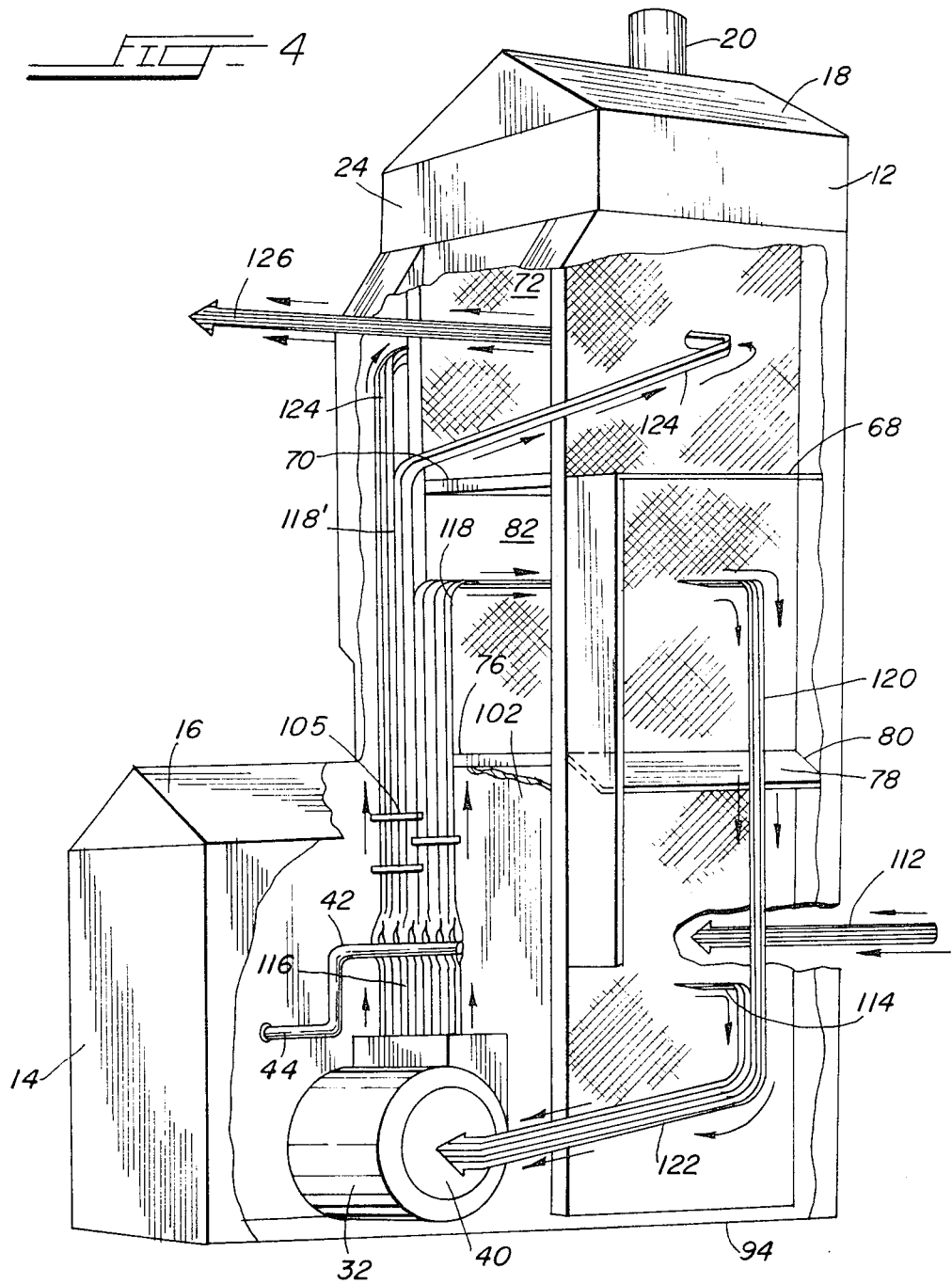

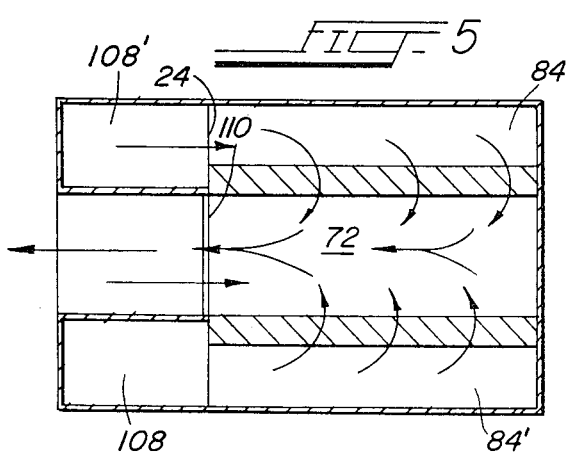
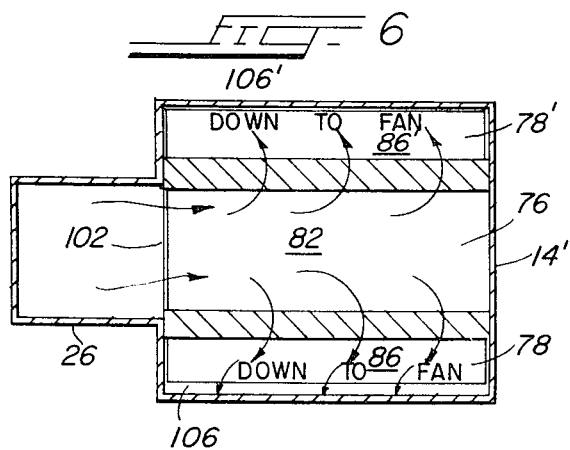
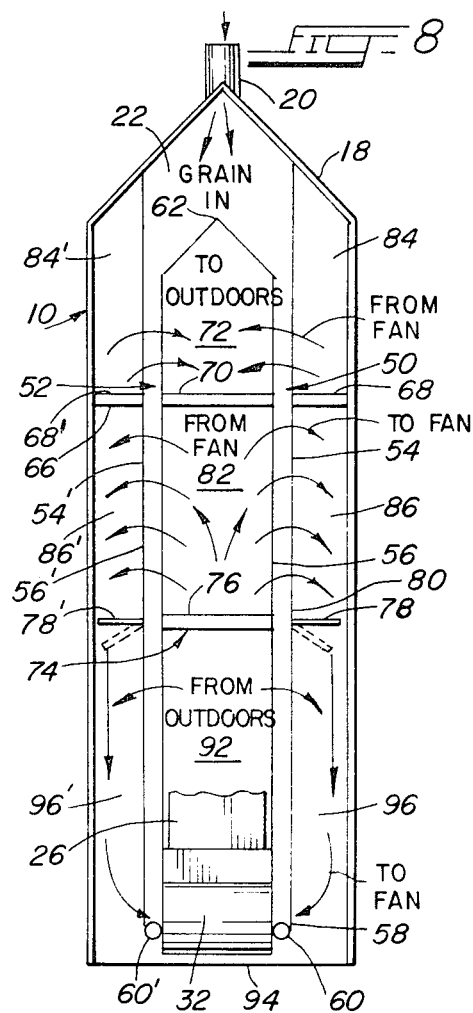
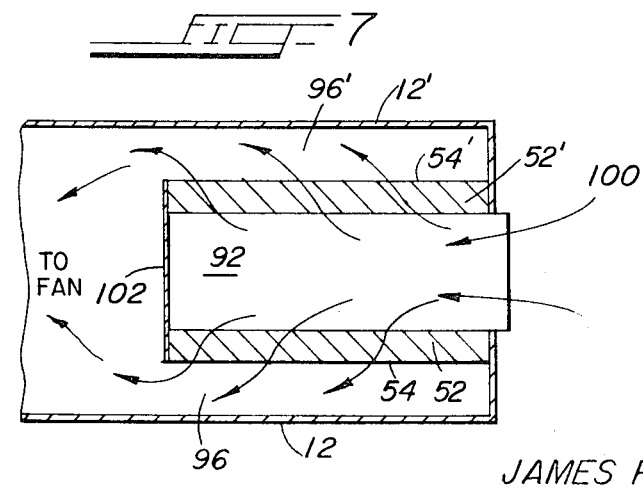

GRAVITY FLOW GRAIN DRIES

BACKGROUND OF THE INVENTION

It is known to dry granular material by countercurrent contact with a heated gas. Where the granular material is a grain such as wheat or corn careful consideration must be given to the frangible nature of the particles along with through-put, that is the number of bushels of the grain treated per hour and the drying efficiency, where the goal is generally the removal of a predetermined amount of moisture so that the grain can be properly stored and subsequently processed.

Prior art dryers or dehydrators for general industrial use take a variety of forms that differ generally from grain dryers which must of necessity be capable of processing large volumes of grain in short periods of time and with the least expense. Accumulations of broken grain kernels within the system must be prevented, the devices must be easily maintained and cleaned, and the dehydration process must be subject to finite control. Uneven heating of the grain causes the kernels to crack or check. Part of these difficulties have been overcome by controlling the temperature of the incoming air, and by dividing the effluent air from the initial contact with the grain and directing a portion thereof to a subsequent contacting zone coadjacent to the final cooling zone. Also, the prior art uses mechanical vibrators, alternate inlet and exhaust ports and various air distributing means to direct the dehydrating air through the grain.

As will be demonstrated herein, the efficiency of these prior dryers in accomplishing a reduction of the water content of corn, for example from about 25 percent to about 15 percent, is about 3,500 B.t.u. per pound of water evaporated. However, the moisture content of the corn is uneven across the grain drying column.

In accordance with this invention an apparatus for drying granular material is provided which attains the desired goal of water removal without uneven drying of the material and at a reduced heat consumption while at the same time increasing the through-put per unit of time. These results are accomplished without introducing mechanical problems or using complicated flue and column systems.

SUMMARY OF THE INVENTION

In accordance with this invention a plural zone dryer for granular material is provided wherein the granular material is continuously subjected to preheated dehydrating gas in a first and second treating zone, wherein the direction of flow of the gas in relation to the granular material is transverse the body of granular material in each zone, but in opposite or different directions, the flow of incoming cool dehydrating gas is transverse the body of granular material in a succeeding zone and the gases conveyed to a first and a second or intermediate zone comprises a preheated mixture of (1) cooling gases or effluent from the next successive zone and (2) at least a portion of the effluent from a second or intermediate zone. In one embodiment the proportion of such recycled effluents is adjusted by finite control of the respective volumes of each so that the desired moisture removal for a particular granular material is maintained without sacrifice of uniformity of moisture loss across the column of granular material. This objective is accomplished by providing an adjustable flue between the second or intermediate zone and the successive or last zone of treatment.

DESCRIPTION OF THE DRAWINGS

One embodiment of this invention is shown in the drawings by way of illustration wherein:

FIG. 1 is a perspective view of the exterior housing for a grain dryer adapted to contain the component parts of the device of this invention.

FIG. 2 is a side elevational view, slightly enlarged and partially cut away to show the interior construction;

FIG. 3 is a schematic view illustrating, by means of arrows and parts shown in their simplest form, the path and relative amounts of dehydrating gases passing through the dryer of this invention;

FIG. 4 is a schematic view of the device of this invention with the sides broken away to show an illustrative flow path of dehydrating gases through the treating zones;

FIG. 5 is a cross-sectional view taken along the lines 5—5 of FIG. 2;

FIG. 6 is a cross-sectional view taken along the lines 6—6 of FIG. 2;

FIG. 7 is a cross-sectional view taken along the lines 7—7 of FIG. 2;

FIG. 8 is an end view of the device shown in FIG. 2 with the outer wall removed; and FIG. 9 is a graph with the percentage of water loss as the ordinate and percentage of column thickness as the abscissa depicting and supplementing the comparative data of example I.

THE PREFERRED EMBODIMENTS

Referring to the drawings the housing 10 represents any form of exterior structure having sidewalls 12, end walls 14 and roof structures 16 and 18 adapted to contain dehydrating gases, provide shelter for the equipment and supporting structure for the flues and treating zones arranged in accordance with this invention. For simplicity of description the invention will be described in relation to a grain or corn dryer adapted to be installed out of doors in connection with the storage silo and related equipment with which it is used. However, it is to be understood that the means and steps to be described in whole or in subcombination can be applied to any type of granular material and various modifications, some of which will be mentioned, can be made in the apparatus to adapt the same to dehydration of other food stuffs and other granular materials. Accordingly, the invention will be described using gravity flow of grain and it will become apparent that other means for conveying the granular material through the treating zones, such as mechanical conveyors, can be used with little alteration of the flue system or the means and steps for its operation.

The housing 10 supports the conduit 20 at its top which communicates to the inlet zone 22 (FIG. 8) under the roof 18, same constituting the grain inlet. The conduit 20 is connected at its other end to the bottom of a storage bin or silo (not shown) representing the source of grain to be dried. Exterior of the housing 10 and supported by thereof 16 against the intermediate wall 24, is the main flue 26 which communicates at the bottom 28 (FIG. 2) with the discharge conduit 30 of the blower 32. The motor 34 represents a source of power operating the blower 32 through the belt drive 36. A suitable bracket support 38 is provided to mount the blower 32 in this relationship. The intake port of the blower 32 is represented at 40 and a regeneration zone or source of heat for the gases, in this instance air, is represented at 42 with the fuel being supplied through the pipe 44 controlled by suitable metering devices (not shown).

As shown in FIG. 8 the housing 10 provides support for a pair of grain columns 50 and 52 each comprising spaced perforate screen walls 54 and 56 and having a bottom 58 communicating with the inlet of a screw conveyor 60 or other suitable means for transporting the dehydrated grain to a storage means (not For purposes of orienting the relative positions of the parts in the respective views some of the parts which are identical are given prime numbers, e.g., the walls 54' and 56' of the columns 52.

The outer walls 54 of the respective columns 50 and 52 extend upwardly to the under side of the roof 18 defining the grain inlet zone 22, therebetween, as shown in FIG. 8. The inner walls 56 converge as indicated at 62 to form a divider so that the grain falls into each column evenly. The rate of input of the grain through the conduit 20 is substantially equal to the rate of withdrawal by the conveyor means 60 so that a constant level of grain is maintained and at least a part if not all of the converging top 62, is covered with grain.

The main section of both walls 54 and 56 in each column below the level of the grain are perforated. For this purpose, these walls can be fabricated of any material which has sufficient strength and chemical inertness to support the grain columns and also withstand the temperatures involved in the dehydration process. For this purpose stainless steel plate or wire screening can be used having evenly spaced openings therein which are of lesser area than the average or smallest size of the grain being processed. Generally, perforations or openings about five sixty-fourths inches in diameter are sufficient for grain as small as rice.

Referring to FIG. 8 a first or topmost transverse floor or baffle 66 is provided extending across the housing 10. The baffle 66 is imperforate and is made up of the two outer sections 68–68' and an inner section 70. This divides the top part of the housing into the first treating zone or section 72 through which the dehydrating gases pass in the direction of the arrows and in a manner to be described.

A second, lower floor or imperforate baffle 74 is provided spaced from the baffle 70 and above the bottom 58 of the grain columns 50 and 52. The inner portion 76 of this baffle, between the grain columns 50 and 52, is stationary and the outer portions 78–78' are hinged at their inner edges 80, by any suitable means, so as to be pivotal downward from the essentially closed full line position to the open or dotted line positions as shown. The baffle 74 divides the housing 10 into the second zone or intermediate section 82 through which the dehydrating gases pass in the direction of the arrows and in a manner to be described.

The foregoing arrangement of baffles 70 and 76 divides the housing 10 into the first and second treating zones with the flow of gases being relatively opposite directions through the grain columns 50 and 52 as illustrated by the respective arrows. Thus, in the construction shown, the flow of gases in the first zone 72 is from the outer plenum chambers 84–84' inwardly through the grain. The flow of gases in the zone 82 is outwardly through the grain and into the chambers 86–86'. The plenum chambers 84–84' and 86 are separate and do not communicate within the housing except, possibly, through the grain columns 50 and 52.

The third zone 92 of the housing 10 is defined between the baffle 74 and the bottom wall 94 and, like the second zone, has corresponding outer chambers 96–96'.

Referring to FIGS. 2 and 7, the backwall 14' has a cool gas or air intake opening 100 which communicates directly with the zone 92 and the imperforate opposite wall member 102 closes off this chamber and causes the cool gas to pass outwardly through the grain columns and, being confined by the sidewalls 12, this gas then passes into the inlets 40 of the blower 32 which, as shown, is a double-inlet device. The outlet or discharge end of the blower conveys the airstream past the burner 42, within the main flue 26 and upwardly over the top of the intermediate wall 102 where a portion of the gas enters into the zone 82 as indicated by the arrows. The wall member 102 can be constructed of sheet metal and may form the backwall of the flue 26.

Means to arrest any sparks or burning material within the main flue 26 are provided at 105, same being transverse alternate, spaced baffles providing a tortuous path for the heated air.

Within the zone 82 the air passes through the grain columns 52 outwardly into the chambers 86 above the movable baffler 78. The baffle 70 prevents the air from progressing upwardly and it is diverted downwardly through the spaces 106–106' into the chambers 96, where it mixes with partially heated air from the zone 92 and is recycled back to the blower 32.

As shown in FIG. 1 the main flue 26 divides just above the baffle 76 into the bypass conduits 108–108' which divide the remaining airstream into two parts and conveys them upwardly to the respective outer chambers 84–84' of the zone 72 whence the air passes inwardly through the grain columns 52 into the interior chamber and then through the louvered outlet 110 to atmosphere. The louvered outlet 110 is constructed within the wall 24 and is of such an area as to avoid any backpressure buildup.

The relationship of the parts and the flow of the airstreams through the column is better indicated by reference to FIGS. 3 and 4 wherein the width of the airpaths is adjusted to approximate the relative volume of each stream. As shown, the incoming cool airstream 112 passes into the zone 92, divides into substantially equal streams 114–114', and passes via the chambers 96 to the respective inlets 40 of the blower 32.

As shown, the discharge stream 116 from the blower passes through the main flue 26 upwardly past the heater 42 and the heated stream divides in the flue 26, approximately 50 percent of the stream, represented at 118, passing into the interior of the zone 82, and thence outwardly through the grain columns, on each side, into the chambers 86–86' wherein the recycle streams 120 are formed and pass through the baffle openings 106–106' to form the second half of the recycle stream 122. The remaining half of the main heated airstream 116, as indicated at 118', passes upwardly in the flue 26 and divides into the flues 108–108', to form the streams 124–124' which pass into the chambers 84 of the zone 72 and thence inwardly through the grain columns to be combined and discharged as the system effluent stream 126.

A representative volumetric relationship between the airstreams is shown in table I in a typical drying operation along with the possible variations using a blower 32 having a maximum output of 51,000 CFM.

TABLE I

| Airstream no. | R.H. % | Temperature | Volume (CFM) | Range (CFM) |
|---|---|---|---|---|
| 112 | 50 | 60°–70° | 26,000 | 20,000–26,000 |
| 114 | 40 | 80°–90° | 13,000 | 10,000–13,000 |
| 122 | 40 | 90°–125° | 26,000 | 20,000–26,000 |
| 116 | 40 | 90°–125° | 52,000 | 40,000–52,000 |
| 118 | 4 | 200° | 26,000 | 20,000–26,000 |
| 120 | 30 | 140° | 13,000 | 10,000–13,000 |
| 118 | 4 | 200° | 26,000 | 20,000–26,000 |
| 124 | 4 | 200° | 13,000 | 10,000–13,000 |
| 126 | 95–100 | 80°–100° | 26,000 | 20,000–26,000 |

In order to further demonstrate this invention, the following examples and comparative test data are given.

EXAMPLE I.

A first grain dryer A representing one of the typical prior art dryers was compared with a prototype dryer B of this invention. The dryer A was constructed with elongated spaced parallel grain columns 50 and 52 within a housing 10 and with variable speed discharge conveyors 60 at the bottom. This dryer has a cooling section 92 at the bottom wherein air at atmospheric conditions was drawn into and passed through the columns 50 and 52 as in the instant invention, that is, from the inside to the plenums 96. The air was taken up by the blower 32 and sent to and distributed along a single zone 82 which comprised the entire hot-air dryer section. Basically the grain dryer A was like the prototype B except that the zone 72 was not present, that is there was no wall 70 and there was no recycle stream 120 or stream 124. Rather, the entire volume of drying air was passed through the grain and discharged to the outside. The grain dryer A had a rated capacity of 750 bushels per hour (BPH) drying corn from a moisture content of about 20 percent to a moisture content of about 15 percent.

The prototype dryer B was of exactly the same physical size as the Dryer A and the effective air flow areas of the drying zone 82 of dryer A was the same as the combined flow areas of the zones 72 and 82 of the dryer B.

The table II following shows the conditions of operation, the capacities and the end results of treating corn from the same bulk source in these two dryers.

TABLE II

|  | Prior Art Dryer "A" | Dryer "B" |
| --- | --- | --- |
| Grain | Corn | Corn |
| Drying Temperature °F. | 200 | 200 |
| % Moisture-in | 25.0 | 25.0 |
| -out | 15.0 | 15.0 |
| -loss | 10.0 | 10.0 |
| BPH in | | |
| -wet basis, 10% drying | 270 | 500 |
| -adjust for 5% drying | 540 | 1000 |
| lb. water evaporated per hour | 1600 | 3000 |
| Fuel-B.t.u. per hour | 5,600,000 | 6,000,000 |
| B.t.u./lb. water evaporated | 3,500 | 2000 |
| Volume of air at fans-CFM | 55,000 | 56,000 |
| Air discharged to atmosphere-CFM | 55,000 | 28,000 |
| Moisture across column- % | | |
| -inside | 14.0 | 14.5 |
| -middle | 17.1 | 15.5 |
| -outside | 20.2 | 14.5 |

As seen from the results shown in table II both dryers were operated at 200° F. and the overall goal of reducing the moisture content of the corn from 25 percent to 15 percent by weight for a 10 percent water loss or removal was attained. However, the throughput of the dryer "B" of this invention was 500 BPH (wet basis) or 1,000 BPH after adjustment for 5 percent drying. This is almost double the capacity of the dryer A. This is reflected in the increase in the pounds of water evaporated per hour which is again almost double. Furthermore, these results are attained with only an increase in fuel consumption of 400,000 B.t.u. per hour and less CFM of air discharged to the atmosphere. Most important the test results show that the moisture content of the finished corn taken from the inside, middle and outside sections of the corn columns in the dryer A varied by 6.2 percent with the minimum variation being 5.1 percent. In contrast the prototype dryer B maintained a 0 percent variation in moisture content across the column from the inside corn to the outside corn and only a 1.0 percent variation as a maximum from the middle of the column in either direction. This data is shown graphically in FIG. 9 where "outside" is the side of the column at which the dehydrating air enters the grain. An important factor in the economy of the dryer B resides in the recirculation of 50 percent of the drying air which results in a maximum water content of the exhausted air as well as the further advantage of a minimum of "heat-shock" on the grain as it enters the dryer.

EXAMPLE II.

The dryer of this invention is used to dry corn having 20 percent water at a drying temperature of about 195° F. using outside air having a relative humidity of about 195° F. using outside air having a relative humidity of 60 percent and at a temperature of about 61° F. About 500 BPH (wet basis) or 1,000 BPH (adjust for 5 percent drying) can be treated under these conditions to bring the moisture content to about 10 percent with a variation across the column of less than 1.0 percent for the finished corn.

EXAMPLE III.

The process of example I is conducted using wheat having a moisture content of 15 percent and the end product has a moisture content of 10 percent with less than 1.0 percent variation in moisture content across the column.

It is apparent from the foregoing that this invention can be carried out under a variety of conditions while still attaining the increased throughput, reduced heat consumption and uniformity of the moisture content of the end product. The method of this invention is carried out by treating a granular material to the following steps:

1. subjecting a flowing mass of granular material, traveling a single continuous path, to contact with a portion of regenerated fluid agent in a first zone under condition to bring about a partially changed product, the fluid agent passing through the granular material in a direction transverse the direction of the flowing mass.
2. Subjecting the partially changed product of the first zone to treatment with another portion of regenerated fluid agent in a second zone to produce a substantially changed product, the fluid agent passing transversely through the granular material in a direction opposite that of the first zone.
3. subjecting the substantially changed product of the second zone to treatment with fresh heating agent in a subsequent zone under conditions to bring about a final desired change and produce the finished granular material and then
4. combining and recycling the effluent treating agent from the second zone and from the subsequent zone to a regeneration zone whereby to form the portions of regenerated treating agent for delivery to the first and second zones respectively.

As applied to the problem of controlled dehydration of grain as the granular material, the fluid agent is air or other gas inert under the conditions imposed, the desired changes are water removal and final cooling, and the regeneration is the application of heat.

As heretofore mentioned, the portion of the dehydrating medium which is recycled from the second zone to the next subsequent zone is subject to variation depending on the nature of the dehydrating medium, ambient or atmospheric conditions where air is used, the degree of dehydration to be obtained and the flow capacity of the system employed. For most operations this portion can vary from about 30 percent to about 70 percent of the fluid capacity of the system. In applying this invention to the drying of grain the foregoing values will apply and for most operations the recycled portion can be 50 percent of the total throughput of air. The proportioning is accomplished by variation of the openings 106 afforded by the baffle plates 78. This expedient can be used to increase the recycled stream 120 when the humidity of the incoming air stream 112 is in the order of 90 percent and decrease the recycled portion when the humidity of the airstream 112 is below 90 percent. In other words the portion or amount of recycled air is adjusted to the dehydrating capacity of the drying medium.

A wide variety of continuous physical and chemical changes can be benefited by applying the process or using the apparatus of this invention. The requirements of intimate and uniform fluid-solid contact along with the conservation of any energy introduced under conditions of maximum fluid volumes for a number of processes can be met and improved results obtained by applying the opposite and transverse flow of the fluid treating agent in the first and second treating zones in conjunction with recycling a controlled and variable portion of the combined effluent treating agent from the second and a third or a subsequent treating zone to the regeneration zone.

It is apparent that one conveyor means represented by the opposed perforate wall members 54 and 56, can be used within a column or other form of enclosure including the plurality of treating zones while still maintaining the transverse and opposite flow feature in the first and second zones along with the recycling and combined effluent technique for the second and third zones. The flow of the treating agent in the zone 72 can be reversed in relation to the flow direction shown for the zone 82 in the drawings. This would require that the duct 108 functions to convey the fluid streams 124 and 124' into the zone 72 between the grain columns of this treating zone and that the plenums 84 and 84' be open to the atmosphere on one of their sides. Also, to accomplish the recycle feature, the dampers 78 and 78' would be positioned between the pair of grain columns, as in the baffle 76. The air intake 100 would be divided and placed so that each half communicated with the plenums 96 and 96' while the wall 102 would be provided with a passageway and duct communicating with the inlet of the blower and with the recycled effluent from the central damper of the zone 82. Other modifications become apparent to one skilled in the art.

I claim:

1. An apparatus for contacting a particulate solid with a fluid treating agent comprising,
  a. a series of successive enclosed treating zones including a first zone, a second zone and a third zone, each of said zones having opposed spaced walls defining an individual chamber,
  b. conveyor means to conduct said solid through said treating zones successively, from first to second and then to third, and adapted to contain said solid as a divider extending across the chamber of each of said treating zones,
  c. each of said chambers of said treating zones having an inlet and an outlet opening on opposite sides of said conveyor means providing a passageway for fluid to pass through said chambers,
  d. said outlet opening of said first treating zone discharging directly to atmosphere and being on the same side of said conveyor means as the inlet opening of said second treating zone and the outlet of said second treating zone communicating directly with the outlet of said third treating zone,
  e. a regeneration zone for said treating agent communicating between the outlet of said third treating zone and the inlets of said first and second treating zones and including means for forcing flow of treating agent therethrough,
  f. said third treating zone having an inlet for entry of fresh treating agent thereinto and
  g. means to control the flow volume of treating agent through the outlet of said second treating 2. An apparatus in accordance with claim 1 in which,
  a. said conveyor means extends as an elongated column in a substantially vertical relationship through said treating zones
  b. means are provided to continuously supply said solid to the top of said conveyor means and withdraw said solid from the bottom thereof, and
  c. said conveyor means comprises perforate walls adapted to retain said particular solid material and allow the passage of said fluid through said walls and into intimate contact with said solid material.

3. An apparatus in accordance with claim 1 in which,
  a. said regeneration zone is a heating zone.

4. An apparatus in accordance with claim 1 in which,
  a. said means for forcing flow of said treating agent is a fluid pump having its inlet connected to the outlet of said third treating zone.

5. An apparatus in accordance with claim 1 wherein,
  a. a pair of said conveyor means is provided extending in spaced relationship from each other and having spaced perforate walls containing the particulate solid therebetween,
  b. means are provided for directing the treating agent through the two conveying means in respectively opposite directions in the first treating zone and in the reverse directions through the respective conveying means in the second and third treating zones,
  c. the outlet of said first treating zone is between said spaced conveyor means,
  d. the inlet of said second treating zone is between said spaced conveyor means, and
  e. the inlet of said third treating zone is between said spaced conveyor means.

6. An apparatus for crosscurrent contacting of a granular solid with a dehydrating gas which comprises,
  a. a vertical housing having a top inlet and a bottom outlet adapted to receive and discharge granular material,
  b. a continuous uninterrupted column within said housing adapted to convey said granular solid from said inlet to said outlet as a continuous flowing stream,
  c. said column having spaced perforate walls confining said flowing stream of granular solid therebetween,
  d. baffle means dividing said housing member into three vertically successive and separate treating zones between said inlet and said outlet, the first zone being uppermost,
  e. means providing a gas inlet to and a gas outlet from each of said treating zones with the gas inlet of the first zone being on the opposite side of said column than the gas inlets of the second and third zones and the gas outlet of the first zone discharging to atmosphere,
  f. a passageway through the baffle means between said second and third heating zones on the gas outlet side of said column,
  g. means within said passageway to control the flow rate of said dehydrating gas therethrough, and
  h. means for introducing fresh gas to the gas inlet side of the third zone.

* * * * *

UNITED STATES PATENT OFFICE
CERTIFICATE OF CORRECTION

Patent No. 3,629,954      Dated December 28, 1971

Inventor(s) James P. Lavalier

It is certified that error appears in the above-identified patent and that said Letters Patent are hereby corrected as shown below:

The following errors were committed by the Patent Office:

The title should be "Gravity Flow Grain Drier".

Column 3, line 41, "86" should read "86-86'".

Column 7, line 35, should read "treating agent thereinto, and".

Column 7, line 37, "zone." should appear after "treating".

Column 7, line 41, should read "zones,".

Signed and sealed this 30th day of May 1972.

(SEAL)
Attest:

EDWARD M. FLETCHER, JR.
Attesting Officer

ROBERT GOTTSCHALK
Commissioner of Patents